United States Patent [19]
Prevost et al.

[11] Patent Number: 5,659,405
[45] Date of Patent: Aug. 19, 1997

[54] MULTIPURPOSE REGISTRATION DEVICE FOR A DIGITAL SCANNER

[75] Inventors: Charles F. Prevost; James O. Mitchel, both of Rochester; Jack K. Fullerton, Webster; Michele D. Taber, Rochester; Michael J. Martin, Hamlin; Richard A. Beck, Fairport, all of N.Y.

[73] Assignee: Xerox Corporation, Stamford, Conn.

[21] Appl. No.: 353,587

[22] Filed: Dec. 12, 1994

[51] Int. Cl.$^6$ ........................................... H04N 1/04
[52] U.S. Cl. .................. 358/486; 358/488; 358/497
[58] Field of Search ................. 358/474, 486–488, 358/496–498; 355/317; 382/315; H04N 1/04

[56] References Cited

U.S. PATENT DOCUMENTS

| | | | |
|---|---|---|---|
| 4,518,999 | 5/1985 | Kurata et al. | 358/488 |
| 4,768,068 | 8/1988 | Partilla. | |
| 4,782,361 | 11/1988 | Spinelli et al. | 358/488 |
| 4,864,415 | 9/1989 | Beikirch et al. | 358/486 |
| 4,933,778 | 6/1990 | Tufano et al. | 358/488 |
| 5,091,654 | 2/1992 | Coy et al. | |
| 5,119,213 | 6/1992 | Graves et al. | 358/488 |
| 5,144,455 | 9/1992 | Stein et al. | 358/474 |
| 5,153,745 | 10/1992 | Brandkamp et al. | 358/475 |
| 5,231,513 | 7/1993 | Yokobori et al. | 358/486 |

*Primary Examiner*—Kim Vu
*Attorney, Agent, or Firm*—Michael J. Nickerson

[57] ABSTRACT

A digital scanner includes a multipurpose registration member that has a document registration edge locate surface, a carriage horizontal locate surface, a carriage vertical locate surface, and a platen locate surface. The platen locate surface provides registration for a transparent platen and the document registration edge locate surface provides registration for a registration edge member. The carriage horizontal locate surface and the carriage vertical locate surface provides registration for a scanning carriage which abuts the slide pad. Also, the multipurpose registration member includes a document handle locate surface to registration a document handler. The inclusion of these locate surfaces on a single registration member enables efficient assembly, without extraneous manual adjustments, of a digital scanner having proper registration.

34 Claims, 1 Drawing Sheet

MULTIPURPOSE REGISTRATION DEVICE FOR A DIGITAL SCANNER

FIELD OF THE PRESENT INVENTION

The present invention is directed to a registration device for a digital scanner. More specifically, the present invention is directed to a multipurpose registration device for a digital scanner which is a single unitary device providing registration for a plurality of devices making up the digital scanner.

BACKGROUND OF THE PRESENT INVENTION

Documents may be scanned by a digital scanner in which a plurality of photosensitive devices are arranged to sense light reflected from a document to produce an electronic output indicative of the intensity of the sensed light. In a simple arrangement, documents are placed on a transparent imaging support platen and relative movement between the sensors and the document is provided, simultaneously with illumination of the document.

As used herein, the direction of relative movement is referred to as a slow scan direction while the direction of electronic acquisition of data is referred to as a fast scan direction.

It is common practice to provide a platen cover in association with the imaging platen to sandwich the document into a fixed position on the imaging platen and to prevent intrusion of extraneous light. Generally, the platen cover portion is placed adjacent the platen and is colored to provide a uniform background.

It is often a problem with the output of digital scanners; either at soft displays, such as video display terminals, or in printed samples of the scanned information; that the scanlines are not exactly parallel in the fast scan direction, or the images do not properly line up in the slow scan direction. This problem arises when a document is not properly registered with the scanning system; i.e., the document is not in the proper skew orientation or the proper orthogonal orientation.

Conventionally, it has been difficult to provide precise registration so that the document to be scanned is scanned at the desired skew orientation because the image may not have been placed squarely on the document, the edges on the document may not be squared causing the image to be skew on the registration of an edge, the sensor may not be registered properly with the platen, or the operator may not have precisely placed the document at the correct registration position on the platen. All these situations may result in a skewed image.

To realize precise registration for a digital scanner and ensure proper image quality, several conditions must be met. The nature of these conditions are illustrated in FIG. 1.

One condition is that the digital scanner must have proper fast scan registration. Proper fast scan registration is realized when an optical center line 5, as illustrated in FIG. 1, and a first pixel of a photosentive array are a known distance from a registration edge 2. If the optical center line 5 and first pixel are a known distance from the registration edge 2, the digital scanner will be able to provide precise fast scan registration.

Another condition of proper registration for a digital scanner is skew. To avoid unnecessary skew, the optical center line 5 must be parallel to the registration edge 2. Moreover, the pixels of the photosentive array (the fast scan direction) represented by image line 7 of FIG. 1 must be perpendicular to the registration edge 2 to prevent the skewed images. Thus, if the optical center line 5 and image line 7 of FIG. 1 meet the specifications discussed above, the images produced by the digital scanner should not be skewed.

A third condition of proper registration for a digital scanner is the placement of the document. More specifically, the document being scanned by the digital scanner must be placed relative to the registration edge 2 of FIG. 1 in a known manner. This is especially important when a document handler is utilized for the placement of a document on the platen platform. The placement of the document by a document handler on the platen platform should be predetermined in order for the digital scanner to known the relevant placement of the document to the registration edge.

Conventionally, to ensure proper registration for a digital scanner, a variety of adjustments in the actual manufacturing and setup of the digital scanner were utilized to meet these conditions. These adjustments were not only to the optical system, but to the registration edge and document handler as well. Such adjustments require additional manhours which significantly add to the cost of manufacturing a digital scanner. More specifically, the various components of a digital scanner were put together, and then a technician, at the manufacturing or customer site, would make manual adjustments to the assembled device so as to ensure proper registration for the digital scanner. Such reliance on manual adjustments after assembly increases labor and tooling costs for the manufacturing of a digital scanner. Moreover, manual adjustments to rails, optical carriages, and document handlers can be time consuming and labor intensive.

Therefore, it is desirable to be able to assemble a digital scanner without requiring extensive manual adjustments in order to assure proper registration.

SUMMARY OF THE PRESENT INVENTION

One aspect of the present invention is a multipurpose registration device having a document registration edge locate surface and a document handler locate surface.

Another aspect of the present invention is a multipurpose registration device having a document registration edge locate surface and a optical carriage horizontal locate surface.

A third aspect of the present invention is a multipurpose registration device having a document registration edge locate surface and a optical carriage vertical locate surface.

A further aspect of the present invention is a multipurpose registration device having a document registration surface and a document handler locate surface.

A fifth aspect of the present invention is a multipurpose registration device having a document registration surface and a optical carriage horizontal locate surface.

A sixth aspect of the present invention is a multipurpose registration device having a document registration surface and a optical carriage vertical locate surface.

A seventh aspect of the present invention is a digital scanner. The digital scanner includes a multipurpose registration member having a document registration edge locate surface, an optical carriage horizontal locate surface, an optical carriage vertical locate surface, and a platen locate surface. The digital scanner also includes a transparent platen abutting the platen locate surface and a registration edge member abutting the document registration edge locate surface. A slide pad abuts the carriage horizontal locate surface and the carriage vertical locate surface, and a scanning carriage abuts the slide pad.

An eighth aspect of the present invention is a digital scanner. The digital scanner includes a multipurpose registration member having a document registration surface, an optical carriage horizontal locate surface, an optical carriage vertical locate surface, and a platen locate surface. The digital scanner also includes a transparent platen abutting the platen locate surface and a registration edge member abutting the document registration edge locate surface. A slide pad abuts the carriage horizontal locate surface and the carriage vertical locate surface, and a scanning carriage abuts the slide pad.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

The following will be a detailed description of the drawings illustrated in the present invention.

Figure 1:
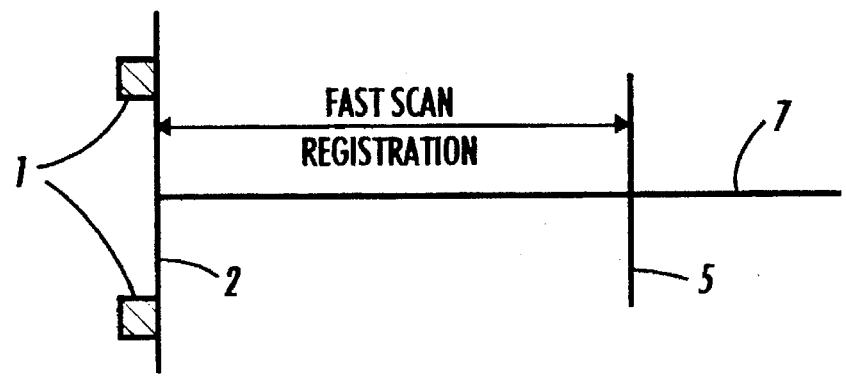
FIG. 1 illustrates registration conditions for a digital scanner.
Figure 2:
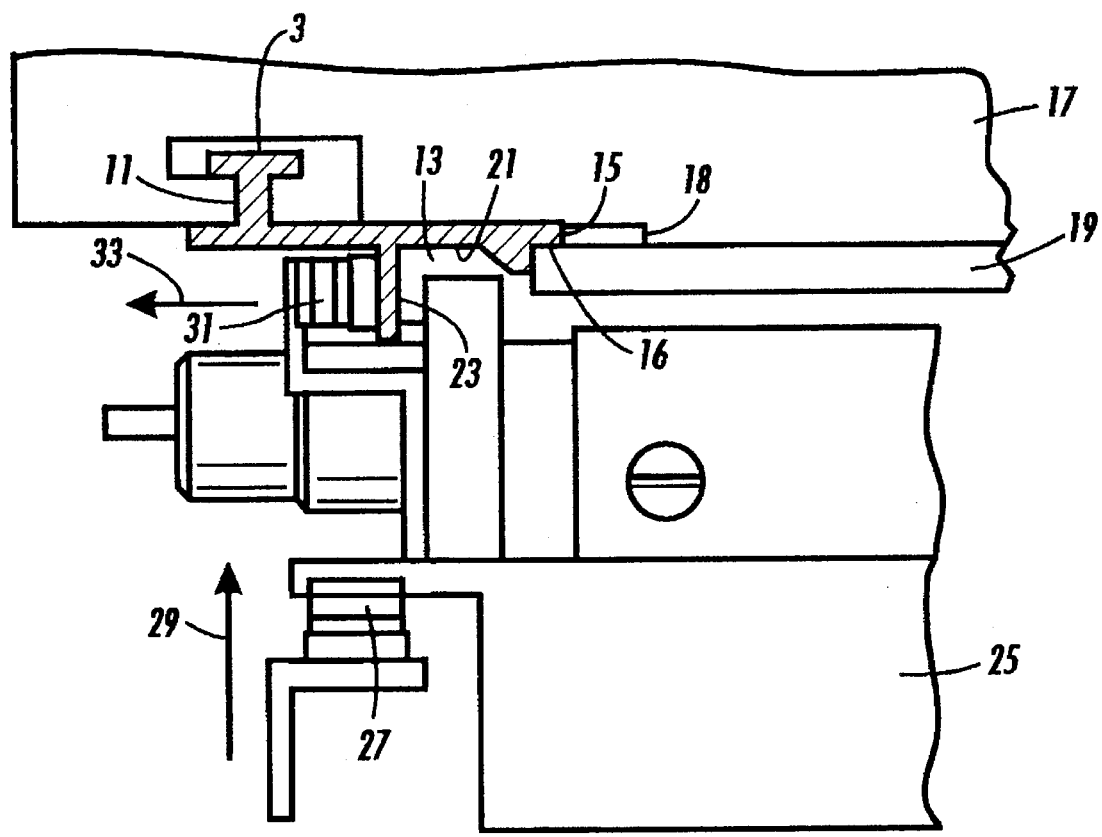
FIG. 2 illustrates a multipurpose registration device for a digital scanner according to the present invention.

FIG. 2 illustrates a digital scanner constructed with a multipurpose registration device 3. More specifically, the multipurpose registration device 3 provides a proper registration for all the significant components of a digital scanner and document handler to ensure a successful scanning of a document placed on a platen 19.

The document may be placed on the platen 19 either manually or by a document handler 17. If the document is placed manually on the platen 19, the document is placed so that one of its edges comes into contact with a document registration edge 18.

Upon placing the document properly on the platen 19, either manually or through the document handler 17, an optics carriage 15 moves along the document in the slow scan direction so as to scan the image on the document. However, it is noted that the document may be moved in the slow scan direction relevant to the optics carriage in order for the image of a document to be fully scanned. In the preferred embodiment of the present invention, as illustrated in FIG. 2, the optics carriage moves relative to the stationary document. To ensure smooth movement of the optics carriage 25, a vertical and horizontal slide pad 13 is provided between the multipurpose registration device 3 and optics carriage 25.

As noted above, for a digital scanner to properly scan a document on the platen 19, the optics of the digital scanner must be properly registered. One aspect of this registration is that the digital scanner requires fast scan registration.

Fast scan registration in the preferred embodiment of the present invention is provided by a document registration edge locate surface 15 and a horizontal registration edge locate surface 23 of FIG. 2. The document registration edge 18 physically abuts the document registration edge locate surface 15 so that the locate surface provides registration for the document registration edge 18. The document registration edge 18 is utilized to physically register a document on the platen 19.

In another embodiment, the document registration edge 18 can be omitted and the document registration edge locate surface 15 of the multipurpose registration device used as a document registration edge to create a document registration surface, thereby eliminating one surface of the multipurpose registration device and the associated labor and cost. In other words, the surface 15 provides registration for the document in lieu of registration for a separate document registration edge. This embodiment incorporates the additional function of document registration into the multipurpose registration device.

Moreover, the horizontal registration edge locate surface 23, through the vertical and horizontal slide pad 13, provides horizontal registration for the scanning carriage 25. The importance of these registrations will be discussed in more detail below.

The combination of the document registration edge locate surface 15 and the horizontal registration edge locate surface 23 enables the scanning carriage 25 and the document registration edge 18 to be positioned in a known relationship so that proper fast scan registration can be realized. In other words, the document registration edge 18 positions the document on the platen 19 and the horizontal registration edge locate surface 23 positions the scanning carriage 25 so that the first pixel and the optical center line 5 of the digital scanner are a known distance from the registration edge, and the document is properly placed with respect to the first pixel and optical center line 5.

The multipurpose registration device 3 also includes a carriage vertical locate surface 21 and a platen registration locate surface 16 which properly registers the platen in the vertical plane of the digital scanner. The carriage vertical locate surface 21 and the platen registration locate surface 16 provide proper registration of the optical carriage 25 in the vertical direction with respect to the scanning of the document so as to control the focus quality of the scanning system. More specifically, if the vertical distance is not proper, the focus of the reflected light from the document may be blurred, resulting in a low quality image. Thus, the combination of the carriage vertical locate surface 21 and platen registration locate surface 16 ensures proper focus of the reflected light impinging upon the photosensitive array.

The carriage vertical locate surface 21 and the carriage horizontal locate surface 23 also provide proper registration for the vertical and horizontal slide pad 13 against which the optical carriage travels when scanning the document on the platen 19. The optics carriage 25 is held against the vertical and horizontal slide pad 13 by a horizontal spring force caused by a horizontal spring 31 and by a vertical spring force caused by a vertical spring 27. The horizontal spring force 33 and the vertical spring force 29 ensures that the optics carriage 25 remains in snug contact with the vertical and horizontal slide pad 13, thus ensuring that the optical center line 5 of the scanning carriage 25 tracks, in parallel, the registration edge, the reflected light from the document remains focus, and the pixels of the photosensitive array represented by the image line 7 are kept perpendicular to the registration edge so as to prevent skewing of the scanned images.

Lastly, the multipurpose registration device 3 includes a document handler locate surface 11 which ensures proper registration of a document handler. By properly registering the placement of the document handler, the placement of the document on the platen 19 by a document handler can be readily determined, thereby enabling proper fast scan registration by the digital scanner.

The multipurpose registration edge 3 provides built-in registration locate surfaces for the various components of a digital scanner, thereby ensuring proper registration of the image without extensive post-assembly manual adjustments. In other words, by providing locate surfaces on the multipurpose registration device 3, the registration and tolerances thereof of the various components can be designed into the manufactured registration device so that an assembler merely abuts the various components against their proper registration locate surface, and the digital scanner is properly registered without extraneous adjustments.

The present invention has been described in detail above; however, various modifications can be implemented without departing from the spirit of the present invention. For example, the preferred embodiment of the present invention has been described with respect to a single carriage system; however, the present invention can be readily implemented with a half-rate/full-rate scanning system wherein the horizontal and vertical registration locate surfaces provide registration for both the illuminating carriage and the lens carriage.

In recapitulation, the present invention provides a multipurpose registration device which provides built-in registration locate surfaces that eliminate the need for registration adjustments after the assembly of a digital scanner.

While the present invention has been described with reference to various embodiments disclosed herein before, it is not to be combined to the detail set forth above, but is intended to cover such modifications or changes as made within the scope of the attached claims.

We claim:

1. A multipurpose registration device, comprising:
   a unitary body including,
      means for locating a document registration edge, and
      means for locating a document handler.

2. The multipurpose registration device as claimed in claim 1, wherein said unitary body further includes means for horizontally registering a scanning carriage and means for vertically registering a scanning carriage.

3. The multipurpose registration device as claimed in claim 1, wherein said unitary body further includes means for locating a platen.

4. The multipurpose registration device as claimed in claim 2, wherein said unitary body further includes means for locating a platen.

5. A multipurpose registration device, comprising:
   a unitary body including,
      means for locating a document registration edge, and
      means for horizontally registering a scanning carriage.

6. The multipurpose registration device as claimed in claim 5, wherein said unitary body further includes means for locating a platen.

7. The multipurpose registration device as claimed in claim 5, wherein said unitary body further includes means for locating a document handler.

8. The multipurpose registration device as claimed in claim 7, wherein said unitary body further includes means for locating a platen.

9. A multipurpose registration device, comprising:
   a unitary body including,
      means for locating a document registration edge, and
      means for vertically registering a scanning carriage.

10. The multipurpose registration device as claimed in claim 9, wherein said unitary body further includes means for locating a document handler.

11. The multipurpose registration device as claimed in claim 10, wherein said unitary body further includes means for locating a platen.

12. The multipurpose registration device as claimed in claim 9, wherein said unitary body further includes means for locating a platen.

13. A multipurpose registration device, comprising:
   a unitary body including,
      means for registering a document, and
      means for locating a document handler.

14. The multipurpose registration device as claimed in claim 13, wherein said unitary body further includes means for horizontally registering a scanning carriage and means for vertically registering a scanning carriage.

15. The multipurpose registration device as claimed in claim 14, wherein said unitary body further includes means for locating a platen.

16. The multipurpose registration device as claimed in claim 13, wherein said unitary body further includes means for locating a platen.

17. A multipurpose registration device, comprising:
   a unitary body including,
      means for registering a document, and
      means for vertically registering a scanning carriage.

18. The multipurpose registration device as claimed in claim 17, wherein said unitary body further includes means for locating a document handler.

19. The multipurpose registration device as claimed in claim 18, wherein said unitary body further includes means for locating a platen.

20. The multipurpose registration device as claimed in claim 17, wherein said unitary body further includes means for locating a platen.

21. A multipurpose registration device, comprising:
   a unitary body including,
      means for registering a document, and
      means for horizontally registering a scanning carriage.

22. The multipurpose registration device as claimed in claim 21, wherein said unitary body further includes means for locating a document handler.

23. The multipurpose registration device as claimed in claim 21, wherein said unitary body further includes means for locating a platen.

24. The multipurpose registration device as claimed in claim 22, wherein said unitary body further includes means for locating a platen.

25. A digital scanner, comprising:
   a multipurpose registration member including a document registration edge locate surface, a carriage horizontal locate surface, a carriage vertical locate surface, and a platen locate surface;
   a transparent platen abutting said platen locate surface;
   a registration edge member abutting said document registration edge locate surface;
   a slide pad abutting said carriage horizontal locate surface and said carriage vertical locate surface; and
   a scanning carriage abutting said slide pad.

26. The digital scanner as claimed in claim 25, wherein said multipurpose member further includes a document handler locate surface.

27. The digital scanner as claimed in claim 26, further comprising:
   a document handler abutting said document handler locate surface.

28. The digital scanner as claimed in claim 25, further comprising:
   horizontal force means for applying a horizontal force to said carriage assembly; and vertical force means for applying a vertical force to said carriage assembly.

29. The digital scanner as claimed in claim 25, wherein said multipurpose registration member is of an unitary construction.

30. A digital scanner, comprising:

a multipurpose registration member including a document registration surface, a carriage horizontal locate surface, a carriage vertical locate surface, and a platen locate surface;

a transparent platen abutting said platen locate surface;

a registration edge member abutting said document registration edge locate surface;

a slide pad abutting said carriage horizontal locate surface and said carriage vertical locate surface; and a scanning carriage abutting said slide pad.

31. The digital scanner as claimed in claim 30, wherein said multipurpose member further includes a document handler locate surface.

32. The digital scanner as claimed in claim 31, further comprising:

a document handler abutting said document handler locate surface.

33. The digital scanner as claimed in claim 30, further comprising:

horizontal force means for applying a horizontal locate to said carriage assembly; and vertical force means for applying a vertical force to said carriage assembly.

34. The digital scanner as claimed in claim 30, wherein said multipurpose registration member is of an unitary construction.

* * * * *